(12) United States Patent
Jackson et al.

(10) Patent No.: US 11,724,558 B2
(45) Date of Patent: *Aug. 15, 2023

(54) SYSTEMS AND METHODS FOR THERMAL MANAGEMENT OF VEHICLE SENSOR DEVICES

(71) Applicant: LG INNOTEK CO., LTD., Seoul (KR)

(72) Inventors: Kenneth J. Jackson, Dearborn, MI (US); Dustin Yautz, Wexford, PA (US)

(73) Assignee: LG INNOTEK CO., LTD., Seoul (KR)

( * ) Notice: Subject to any disclaimer, the term of this patent is extended or adjusted under 35 U.S.C. 154(b) by 57 days.

This patent is subject to a terminal disclaimer.

(21) Appl. No.: 17/238,807

(22) Filed: Apr. 23, 2021

(65) Prior Publication Data

US 2021/0237531 A1 Aug. 5, 2021

Related U.S. Application Data

(63) Continuation of application No. 16/223,643, filed on Dec. 18, 2018, now Pat. No. 11,007,841.

(51) Int. Cl.
*B60H 1/00* (2006.01)
*B60R 11/04* (2006.01)
(Continued)

(52) U.S. Cl.
CPC ............ *B60H 1/0025* (2013.01); *B60R 11/04* (2013.01); *B60S 1/0848* (2013.01);
(Continued)

(58) Field of Classification Search
CPC ... B60H 1/0025; B60H 1/00271; B60R 11/04; B60S 1/0848; B60S 1/56; B60S 1/488
See application file for complete search history.

(56) References Cited

U.S. PATENT DOCUMENTS 9,108,596 B2 8/2015 Stratton
9,604,601 B2 3/2017 Hsiao et al.
(Continued)

FOREIGN PATENT DOCUMENTS

DE 19850639 A1 5/1999
EP 3069942 A1 9/2016
(Continued)

*Primary Examiner* — Benjamin L Osterhout
(74) *Attorney, Agent, or Firm* — Birch, Stewart, Kolasch & Birch, LLP

(57) ABSTRACT

Methods and systems for thermal management of sensors of a vehicle. The system includes a sensor that is attached to a vehicle, a temperature monitor configured to collect temperature data corresponding to the sensor, a processor, and a sensor cleaning subsystem. The sensor cleaning subsystem includes a cleaning fluid reservoir and a port that is positioned to direct cleaning fluid from the reservoir to the sensor. The processor is configured to: receive temperature data corresponding to the sensor from the temperature monitor, determine that a current temperature of the sensor is greater than a first threshold temperature, and cause the sensor cleaning subsystem to initiate a cleaning cycle and direct the cleaning fluid to the sensor to cool down the sensor in response to determining that the current temperature of the sensor is greater than the first threshold temperature.

20 Claims, 6 Drawing Sheets

(51) Int. Cl.
  *B60S 1/08* (2006.01)
  *B60S 1/56* (2006.01)
  *B60S 1/48* (2006.01)

(52) U.S. Cl.
  CPC ........... *B60H 1/00271* (2013.01); *B60S 1/488* (2013.01); *B60S 1/56* (2013.01)

(56) References Cited

U.S. PATENT DOCUMENTS

| | | | |
|---|---|---|---|
| 9,638,480 B1 | 5/2017 | Maranville | |
| 9,992,388 B2 | 6/2018 | Romack et al. | |
| 10,035,498 B2 | 7/2018 | Richardson et al. | |
| 10,173,646 B1 | 1/2019 | Rice et al. | |
| 11,007,841 B2* | 5/2021 | Jackson | B60S 1/0848 |
| 2003/0052016 A1 | 3/2003 | Lin et al. | |
| 2007/0284457 A1 | 12/2007 | Shank et al. | |
| 2011/0266375 A1 | 11/2011 | Ono et al. | |
| 2012/0000024 A1 | 1/2012 | Layton | |
| 2012/0174333 A1 | 7/2012 | Heidacker | |
| 2013/0092758 A1 | 4/2013 | Tanaka et al. | |
| 2013/0096763 A1 | 4/2013 | Izumi | |
| 2013/0276831 A1 | 10/2013 | Alsadah | |
| 2014/0030159 A1 | 1/2014 | SerVaas et al. | |
| 2014/0222283 A1 | 8/2014 | Getman et al. | |
| 2014/0299308 A1 | 10/2014 | Elliott | |
| 2015/0032292 A1 | 1/2015 | Stratton | |
| 2016/0001330 A1 | 1/2016 | Romack et al. | |
| 2016/0046264 A1 | 2/2016 | Shank et al. | |
| 2016/0167624 A1 | 6/2016 | Lansinger | |
| 2016/0193986 A1 | 7/2016 | Trager | |
| 2016/0272163 A1 | 9/2016 | Dreiocker et al. | |
| 2016/0339875 A1 | 11/2016 | Ina et al. | |
| 2017/0081997 A1 | 3/2017 | Potyrailo et al. | |
| 2017/0086634 A1 | 3/2017 | Jacobson et al. | |
| 2017/0138922 A1 | 5/2017 | Potyrailo et al. | |
| 2017/0182981 A1 | 6/2017 | Hsiao et al. | |
| 2018/0015907 A1 | 1/2018 | Rice | |
| 2018/0120227 A1 | 5/2018 | Ng et al. | |
| 2018/0354467 A1 | 12/2018 | Glickman et al. | |
| 2018/0354469 A1 | 12/2018 | Krishnan | |
| 2019/0072761 A1 | 3/2019 | Dissette et al. | |
| 2019/0076866 A1 | 3/2019 | Stultz | |
| 2019/0091738 A1 | 3/2019 | Chen | |
| 2019/0113743 A1 | 4/2019 | Kumar | |
| 2019/0136775 A1 | 5/2019 | Dudar | |
| 2019/0210570 A1 | 7/2019 | Schmidt | |
| 2020/0001830 A1 | 1/2020 | Deane et al. | |
| 2020/0001832 A1 | 1/2020 | Deane et al. | |
| 2020/0116828 A1 | 4/2020 | Yautz et al. | |
| 2020/0189348 A1 | 6/2020 | Jackson et al. | |
| 2020/0189529 A1 | 6/2020 | Jackson et al. | |
| 2020/0189531 A1 | 6/2020 | Baldovino et al. | |
| 2020/0254615 A1 | 8/2020 | Bryner et al. | |
| 2020/0271682 A1 | 8/2020 | Engelhardt et al. | |

FOREIGN PATENT DOCUMENTS

| | | |
|---|---|---|
| JP | 2018138918 A | 9/2018 |
| KR | 20060002046 A | 1/2006 |
| KR | 20110034156 A | 4/2011 |
| WO | 2017192672 A1 | 11/2017 |
| WO | 2018023067 A1 | 2/2018 |

* cited by examiner

SYSTEMS AND METHODS FOR THERMAL MANAGEMENT OF VEHICLE SENSOR DEVICES

RELATED APPLICATIONS AND CLAIM OF PRIORITY

This application claims priority to and is a continuation application of U.S. patent application Ser. No. 16/223,643, filed Dec. 18, 2018, the disclosure of which is hereby incorporated by reference in its entirety.

BACKGROUND

This disclosure relates generally to controlling the temperature of vehicle components and specifically to controlling the temperature of vehicle sensor components.

Modern vehicles rely on sophisticated sensors to provide an associated computer or controller with location and situational awareness information such as the relative position of other vehicles, and the location of the vehicle relative to the traffic lanes. Such sensor devices are temperature sensitive with a preferred operational temperature range. If exposed to temperatures outside of the operational temperature range (e.g., when the internal temperature of the vehicle is high due to greenhouse effects), the sensor device may not operate or perform reliably. In some cases, the sensor device may even be subject to a shortened lifespan.

Furthermore, some sensor devices (such as a parking assist camera) are installed on the outside of the vehicle. Hence, the interior cooling systems of the vehicle cannot control the temperature of such externally installed sensor devices. Finally, some vehicles are operated in hot climates where the ambient air temperature is more than the upper threshold of the temperature specification of various sensor devices, and which may also exacerbate the greenhouse effect inside the vehicle.

SUMMARY

Systems and methods for thermal managements of vehicle sensor devices are disclosed. In an embodiment, a vehicle sensor system may include a sensor that is attached to a vehicle, a temperature monitor configured to collect temperature data corresponding to the sensor, a processor in communication with the temperature monitor, and a sensor cleaning subsystem. The sensor cleaning subsystem may include a cleaning fluid reservoir and a port that is positioned to direct cleaning fluid from the reservoir to the sensor. The processor may be configured to execute the method disclosed in this disclosure. The method may include receiving temperature data corresponding to the sensor from the temperature monitor and determine whether a current temperature of the sensor is less than a threshold temperature. In response to determining that a current temperature of the sensor is greater than a first threshold temperature, the method may include causing the sensor cleaning subsystem to initiate a cleaning cycle and direct the cleaning fluid to the sensor to cool down the sensor.

Optionally, the threshold temperature may be less than an upper bound of an operational temperature range of the sensor.

In one or more embodiments, the method may include before causing the sensor cleaning subsystem to initiate the cleaning cycle determining whether the vehicle is in a safe to clean mode. The cleaning cycle may only be initiated in response to determining that the vehicle is in a safe to clean mode. The method may include determining that the vehicle is not in the safe to clean mode upon occurrence of at least one of the following conditions: discomfort to passengers of the vehicle, creation of hazardous conditions because of sensor cleaning, the vehicle being in a high traffic area, the vehicle moving at a high speed, hazardous weather conditions, and/or movement of the vehicle during a cleaning cycle.

Additionally and/or alternatively, the method may include, before causing the sensor cleaning subsystem to initiate the cleaning cycle, determining whether the vehicle is in an idle mode. The cleaning cycle may only be initiated in response to determining that the vehicle is in an idle mode. If the vehicle is not in an idle mode, the method may include causing a temperature control subsystem of the vehicle to initiate a cooling cycle to cool down the sensor. Initiation of the cooling cycle may include turning on of the temperature control subsystem, increasing the cooling efficiency of the temperature control subsystem, and/or decreasing the heating efficiency of the temperature control subsystem. Optionally, the method may also include determining whether the current temperature of the sensor is greater than a second threshold temperature. If the current temperature is greater than the second threshold temperature, the sensor cleaning subsystem may initiate a cleaning cycle and direct the cleaning fluid to the sensor to cool down the sensor. The second threshold temperature may be greater than the first threshold temperature. Optionally, the system may first determine whether the vehicle is in a safe to clean mode, and initiate the cleaning cycle only in response to determining that the vehicle is in a safe to clean mode. The method may, optionally, include determining that the vehicle is in the idle mode upon occurrence of at least one of the following conditions: the vehicle being stationary for a certain time period, an indication that a vehicle engine will be turned on within a threshold period of time, an indication that the vehicle will start moving within a threshold period of time, a vehicle key being within a predetermined range of the vehicle; presence of an occupant in the vehicle which the vehicle is stationary, and/or unlocking of the vehicle before the vehicle starts moving.

In one or more embodiments, the method may also include stopping the cleaning cycle after a pre-determined time period, in response to determining that the current temperature of the sensor is less than the first threshold temperature, receipt of user instructions, in response to determining that it is unsafe to continue the cleaning cycle and/or at the end of an idle mode of the vehicle.

The methods may also include receiving the temperature data corresponding to the sensor from the temperature monitor associated with the sensor in response to detecting a triggering event such as, for example, activation of the sensor, ignition of a vehicle engine, detection of an occupant in the vehicle, detecting that environmental temperature outside the vehicle is greater than a second threshold temperature, detecting that ambient temperature inside the vehicle greater than a third threshold temperature, an indication that the vehicle will be started within a certain time interval; unlocking of the vehicle, presence of a vehicle key within a predetermined distance of the vehicle, and/or receipt of user instructions.

In certain implementations, the method may include continuing monitoring the temperature of the sensor after initiation of the cleaning cycle, and shutting down the sensor if the temperature of the sensor remains greater than the first threshold temperature after a time period.

Examples of cleaning fluid may include fluids that include one or more of the following components: methanol, ethanol, glycol, isopropyl alcohol, and water.

DETAILED DESCRIPTION

Figure 1:
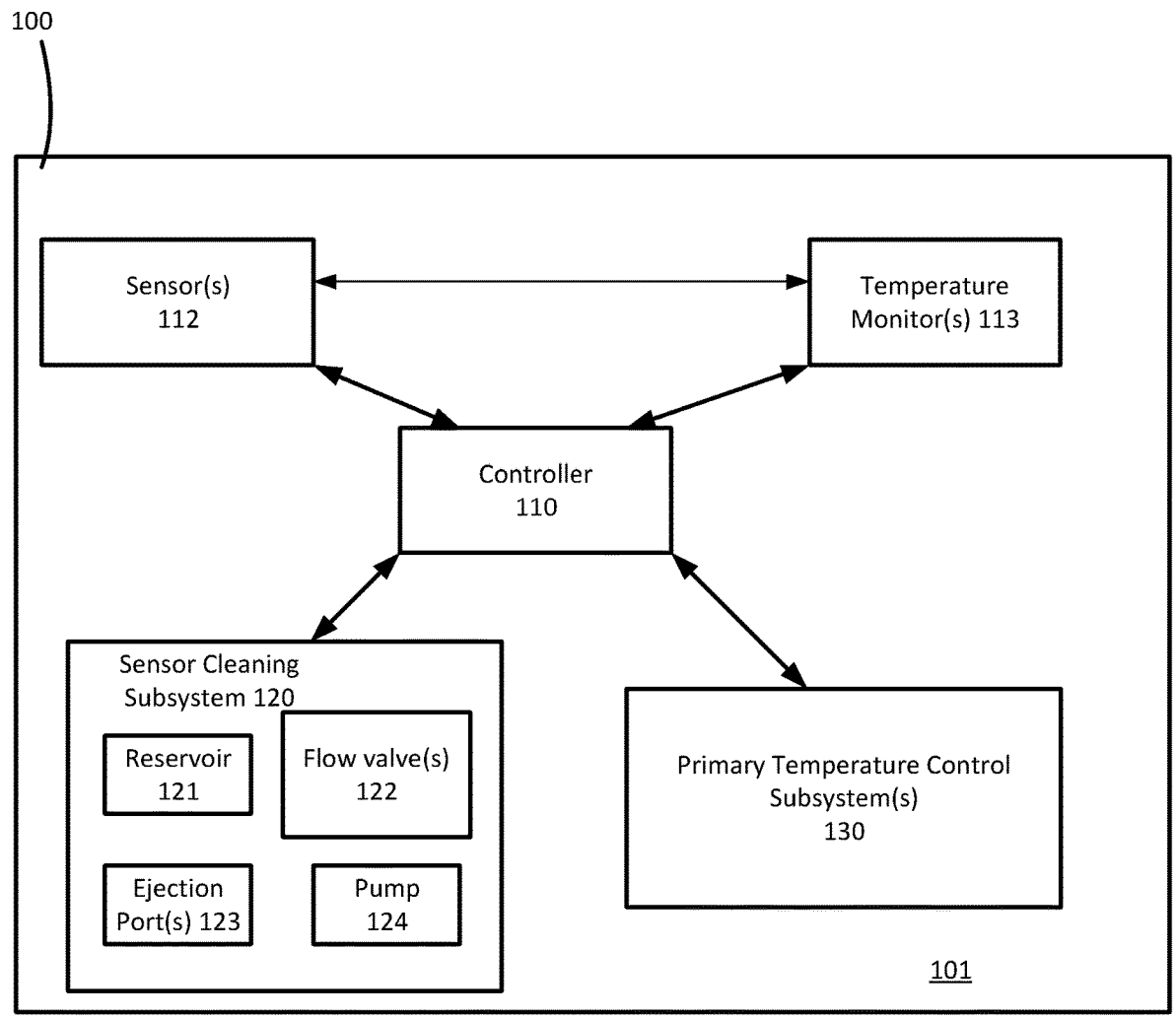
FIG. 1 illustrates an example system for controlling the temperature of a sensor in a vehicle.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Furthermore, the term "about," as used herein when referring to a measurable value such as time, temperature, volume or the like, is meant to encompass any normal fluctuations appreciated by one of ordinary skill in the relevant art.

Various embodiments of the present disclosure will be described below with reference to the drawings constituting a part of the description. It should be understood that, although terms representing directions are used in the present disclosure, such as "front", "rear", "upper", "lower", "left", "right", and the like, for describing various example structural parts and elements of the present disclosure, these terms are used herein only for the purpose of convenience of explanation and are determined based on the example orientations shown in the drawings. Since the embodiments disclosed by the present disclosure can be arranged according to different directions, these terms representing directions are merely used for illustration and should not be regarded as limitation. Wherever possible, the same or similar reference marks used in the present disclosure refer to the same components.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "vehicle", as used herein, refers to any moving form of conveyance that is capable of carrying either one or more human occupants and/or cargo and is powered by any form of energy. The term "vehicle" includes, but is not limited to: cars, trucks, vans, minivan, trains, autonomous vehicles, flying robotic machines, or the like.

FIG. 1 is a block diagram illustrating an example system 100 that includes a vehicle 101. While this application describes the sensor as being installed on a vehicle by way of example, the system (and associated methods) may be used on other equipment that has sensors such as, without limitation, manufacturing equipment, monitoring systems, or other sensor-equipped devices. In some embodiments, the vehicle 101 includes a controller 110, one or more sensors 112, one or more temperature monitors 113 configured to collect temperature data corresponding to the one or more sensors 112, a sensor cleaning subsystem 120. In some embodiments, the vehicle 101 may also include a temperature control subsystem(s) 130.

When used on a vehicle, the one or more sensors 112 may be configured to collect data relating to various components or conditions of the vehicle 101. Examples of vehicle components include, without limitations, a braking system, a steering system, a powertrain, etc. Examples of vehicle conditions include, without limitations, speed, acceleration, pitch, yaw, roll, etc. Examples of sensors may include, without limitation, cameras, temperature sensors, position sensors, location sensors, fuel sensors, motion sensors, global positioning system (GPS), humidity sensors, occupancy sensors, or the like. The sensors 110 may be located on the outside of the vehicle 101 and/or inside the vehicle 101. Each of the one or more sensors has an operational temperature range within which the sensor operates reliably and/or that improves the lifespan of the sensor. For example, certain sensors in a vehicle may have an operational temperature range of about −40° C. to about 85° C.

In certain embodiments, the one or more temperature monitors 113 may be configured to collect temperature data corresponding to the one or more sensors 112 and transmit the collected data to the controller 110. In an embodiment, each of the one or more sensors 112 may be associated with and/or include a temperature monitor. Alternatively and/or additionally, a plurality of the one or more sensors 112 may be associated with a single temperature monitor. For example, a temperature monitor may be configured to collect temperature data in the vicinity of collection of sensors that are placed close to each other within the vehicle 101. Examples of the temperature monitors may include any now or hereafter known temperature sensors such as, without limitation, thermistors, thermocouples, semiconductor-based temperature sensors, resistance temperature detectors, or the like.

The vehicle 101 may also include a sensor cleaning subsystem 120 including a cleaning fluid reservoir 121 configured to hold a cleaning fluid. The cleaning fluid reservoir may be in fluid communication with one or more ejection ports 123 via at least one fluid pump 124. The fluid pump 124 may be configured to control the flow rate and pressure of fluid flow from the cleaning fluid reservoir 121 to the one or more ejection ports 123. The one or more ejection ports 123 may be disposed proximate to each of the one or more sensors 112, and may receive the cleaning fluid from the cleaning fluid reservoir 121 via one or more control valves 122. In certain embodiments, the one or more control valves 122 are configured to direct and control the flow of cleaning fluid towards a subset of the one or more sensors 112 upon receipt of instructions from the controller 110. For example, a control valve may be open, close, partially open, or the like, in order to allow, stop, or otherwise volumetrically control the flow of the cleaning fluid towards a sensor. The ejection ports 123 may be positioned to (and/or may include a fluid delivery device configured to) deliver cleaning fluid around and/or to the surface of the corresponding sensor and/or sensor body. Example may include, without limitation, nozzles, sprays, or the like. In certain embodiments, a brush or other mechanical cleaning device may associated with the ejection ports 123 to effect mechanical cleaning of a sensor.

The cleaning fluid may be a variety of known substances that can clean dirt, debris, etc. from the one or more sensors and also have a cooling effect on objects that come in contact with the cleaning fluid. For example, the cleaning fluid may have a boiling temperature that is below and/or close to the upper threshold of the operational temperature range of the one or more sensors and that is suitable to clean dirt, debris, etc. from the one or more sensors. For example, the cleaning fluid may be a mixture including, in part, methanol and water that has a boiling temperature of about 65° C., when the operational temperature range of the one or more sensors is about 85° C. Having a boiling point that is less than that of pure water allows for triggering of evaporation at a lower temperature and thus helps in removal of heat from a sensor. Other examples of the cleaning fluid may include, without limitation, water, organic solvents, inorganic solvents, glycol mixtures, ethanol mixtures, isopropyl alcohol mixtures, ammonia mixtures, or any other washer fluids.

On the other hand, if the cleaning fluid is used for heating of a sensor, the cleaning fluid may have properties such as freezing point below the lower operational range of the sensor, or the like. It will be understood to those skilled in the art that the composition and/or relative percentages of one or more components of the cleaning fluid may vary depending on whether the cleaning fluid may be used for cooling a sensor or heating a sensor.

In some embodiments, the controller 110 may include a processor that is configured to control at least some of the operations of the sensor cleaning subsystem 120 and/or the temperature control subsystem(s) 130, as described below in more detail. In an embodiment, controller 110 may control at least some of the operations of the sensor cleaning subsystem 120 and/or the temperature control subsystem(s) 130 based on data received from the one or more sensors 112 and/or the one or more temperature monitors 113. The controllers described herein may be microcontrollers or any other suitable type controller.

Controllers of prior art vehicle systems are configured to control the flow of cleaning liquid towards a sensor of a vehicle in relation to a cleaning operation only. For example, the prior art controllers may direct the cleaning liquid towards a sensor periodically, upon receiving a signal that the sensor needs cleaning (for e.g., when images obtained by a camera sensors a blurry, a sensor is malfunctioning, etc.), and/or user instructions. Alternatively, the prior art controllers may stop the flow of cleaning liquid towards a sensor if the sensor is clean, the vehicle is moving at high speeds, or the like. However, the current disclosure describes the use of existing sensor cleaning subsystems for cooling one or more sensors of the vehicle based on their operational temperature ranges.

In an embodiment, the vehicle 101 further includes one or more temperature control subsystem(s) 130 for each sensor or a group of sensors. The temperature control subsystem(s) 130 may be any now or hereafter known sensor temperature control systems configured to control the temperature of a sensor and/or a group of sensors (e.g., located in a particular vehicle region) using, for example, air based temperature control. It will be understood to those skilled in the art that operations of the temperature control subsystem(s) 130 and the sensor cleaning subsystem 120 to control the temperature of one or more sensors of the vehicle 101 are not correlated with each other. In other words, the temperature control subsystem(s) 130 and the sensor cleaning subsystem 120 may control the temperature of one or more sensors of the vehicle 101 in conjunction with each other and/or in the absence of operation of the other.

In certain embodiments, the one or more temperature control subsystem(s) 130 may also include temperature control system that control the ambient temperature of the interior of the vehicle 101. Examples may include, without limitation, vehicle automotive heating, ventilation, and air conditioning (HVAC) system, air flow system, or the like.

Figure 2:
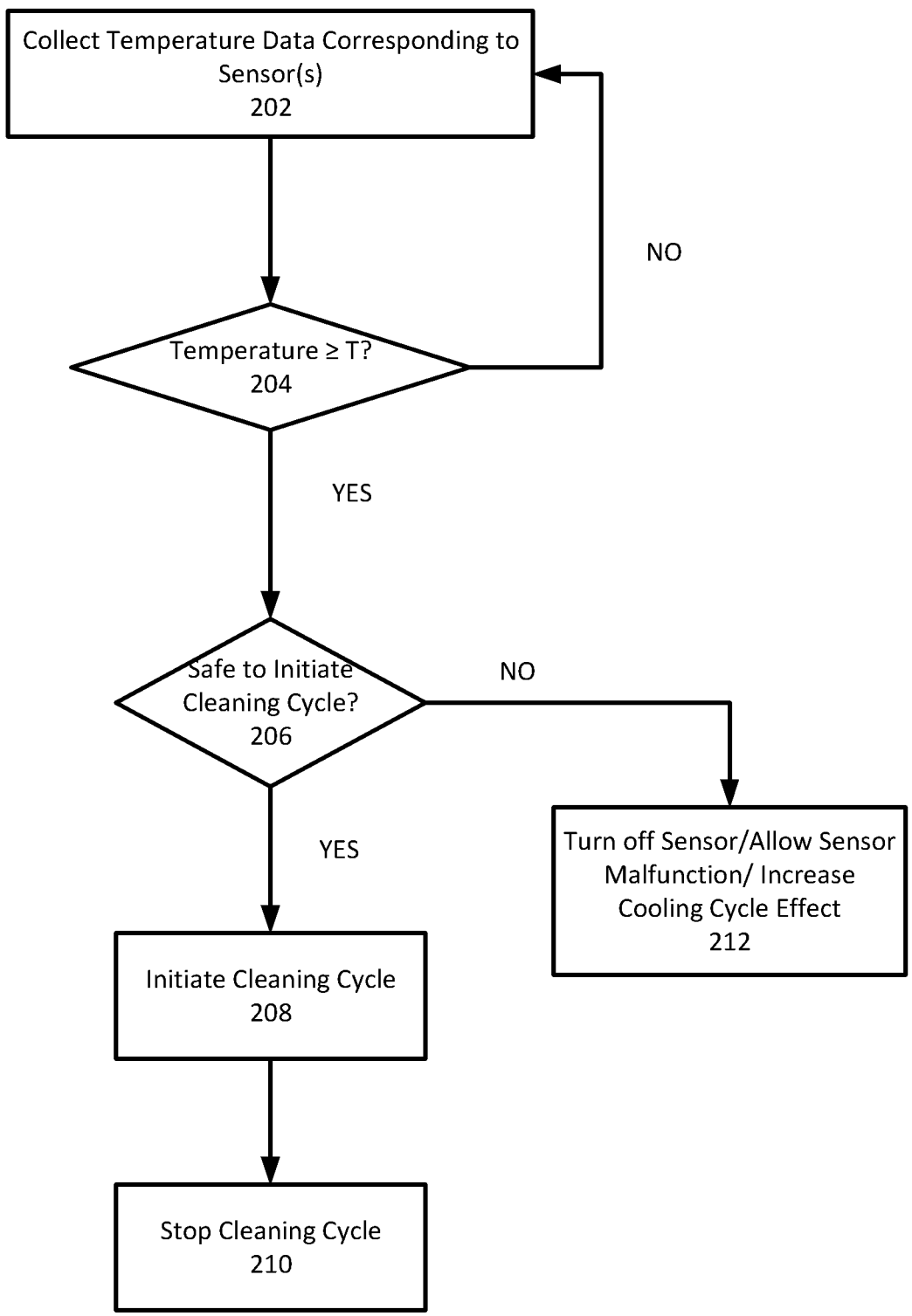
FIG. 2 illustrates an example method of controlling the temperature of one or more sensors in a vehicle.

FIG. 2 is a flowchart in accordance with various embodiments illustrating and describing an example method of controlling the temperature of one or more sensors of a vehicle (cooling effect). While the method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2 but the process may be integrated and/or one or more steps may be performed together, simultaneously, or the steps may be performed in the order disclosed or in an alternate order. Likewise, one or more steps described below need not be performed.

At 202, the system collects temperature data corresponding to each of the one or more sensors. In an embodiment, the temperature data may be temperature of a sensor. Alternatively and/or additionally, the temperature data may be temperature of the proximate area around a sensor. The system may start collecting temperature data periodically after a triggering event. Examples of the triggering event may include, without limitation, activation of a sensor, ignition of the vehicle engine, detection of an occupant in the vehicle, environmental temperature outside the vehicle over a threshold temperature, ambient temperature inside the vehicle over a threshold temperature, an event indicating that the vehicle will be started within a certain time interval (e.g., in response to a transaction with a passenger requesting a ride in the vehicle using a ride-share app), unlocking of the vehicle, vehicle driver information (e.g., schedules, habits, or the like), presence of the vehicle key within a predetermined distance of the vehicle, user instructions, etc. or a combination thereof.

At 204, the system may determine whether the temperature corresponding to the sensor is greater than or equal to a threshold temperature (T). In an embodiment, the system may analyze the collected temperature data corresponding to the sensor and/or in the vicinity of the sensor to determine if the temperature of the sensor is greater than or equal to the threshold temperature (T). The threshold temperature (T) may be a temperature that is less than or equal to the upper bounds of the operational temperature range of the sensor. Alternatively, the threshold temperature may be a temperature less than or equal to a temperature at which the sensor will start to malfunction. If the temperature is less than T (204: NO), the system may continue collecting temperature data (i.e., step 202).

If the temperature is greater than or equal to T (204: NO), the system may at 206 determine whether it is safe to initiate a cleaning cycle. The system may determine if it safe to initiate the cleaning cycle based on a rule set that includes rules specifying that it is unsafe to initiate the cleaning cycle upon occurrence of one or more conditions. Examples of such conditions may include, without limitation, discomfort to the passengers of the vehicle, creation of hazardous conditions because of sensor cleaning (e.g., obstruction of driver view through the windshield, driver distraction when the vehicle starts moving if it is a manned vehicle, obstruction of sensor functioning, etc.), high traffic area, vehicle moving at high speeds, hazardous weather conditions, vehicle movement at any speed during cleaning cycle, or the like. Additionally and/or alternatively, the rule set may include rules identifying conditions that are determined to be safe for initiation the cleaning cycle such as, without location, location of the vehicle, speed of the vehicle, occupancy of the vehicle, type or location of the sensor, weather conditions time of the day, or the like, such that initiation of a cleaning cycle does not compromise the data collected by a sensor and/or may lead to a hazardous condition (e.g., accident). The inclusion of one or more of the above conditions in the rule set may depend on, without limitation, position of the sensor in the vehicle, type of the sensor, whether or not the vehicle is moving, anticipated start time of vehicle movement, position of vehicle passengers in the vehicle, etc. For example, if the sensor is a camera sensor for which integrity of the data collected will be compromised if cleaning fluid is sprayed on the camera sensor, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, for a manned vehicle, if the sensor is located on or near the windshield, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, if a sensor is critical to navigating through a high traffic area (e.g., blind spot sensor), the rule set may include a rule that it is unsafe to clean the sensor whenever the vehicle is in a high traffic area and/or is anticipated to be in a high traffic area (based on, for example, the navigation system data).

The system may make the determination of whether or not it is safe to initiate a cleaning cycle based on data obtained from one or more sensors of the vehicle.

If the system determines that it is not safe to initiate a cleaning cycle (206: NO), it may cause the sensor to stop functioning (i.e., turn off) in order to prevent sensor malfunction and/or breakdown (212). Alternatively, the system may not turn off the sensor if the sensor functioning is critical to the operation of the vehicle and sensor malfunction is acceptable. In another embodiment, the system may either initiate a cooling cycle using the temperature control subsystem of that sensor and/or increase the cooling effect of the temperature control subsystem, if it is already turned on (e.g., by increasing fan speed).

However, if the system determines that it is safe to initiate a cleaning cycle (206: YES), the system may cause the sensor cleaning subsystem of the vehicle to initiate a cleaning cycle (208) for the sensor. In an embodiment, initiation of a cleaning cycle causes the controller to operate one or more valves (i.e., open and/or close) of the cleaning subsystem to direct cleaning fluid from the cleaning fluid reservoir towards the sensor. The controller may control the flow rate and/or fluid pressure via a pump. As discussed above, the cleaning fluid has a cooling effect and may bring down the temperature of the sensor within its normal operational range.

At 210, the system may cause the cleaning subsystem to stop the cleaning cycle. In an embodiment, stopping the cleaning cycle causes the controller to operate one or more valves (i.e., open and/or close) of the cleaning subsystem to stop the flow of cleaning fluid from the cleaning fluid reservoir towards the sensor. The system may stop the cleaning cycle upon occurrence of one or more of the following: receipt of user instructions to stop the cleaning cycle, after a certain period of time, based on temperature data corresponding to the sensor (e.g., if the temperature is at least a pre-defined value below T, determining that it unsafe to continue the cleaning cycle (based on the rule set described above in step 208 with respect to unsafe conditions), etc. The pre-defined temperature value below T may be determined by taking into account that the cleaning fluid needs some time to cool down the sensor (i.e., cooling is not immediate).

Furthermore, in certain embodiment, the system may continue monitoring the temperature of the sensor after stopping of the cleaning cycle and may cause the sensor to stop functioning (i.e., turn off) in order to prevent sensor malfunction and/or breakdown if the temperature is still greater than or equal to T. Alternatively, the system may let the sensor malfunction.

Figure 3:
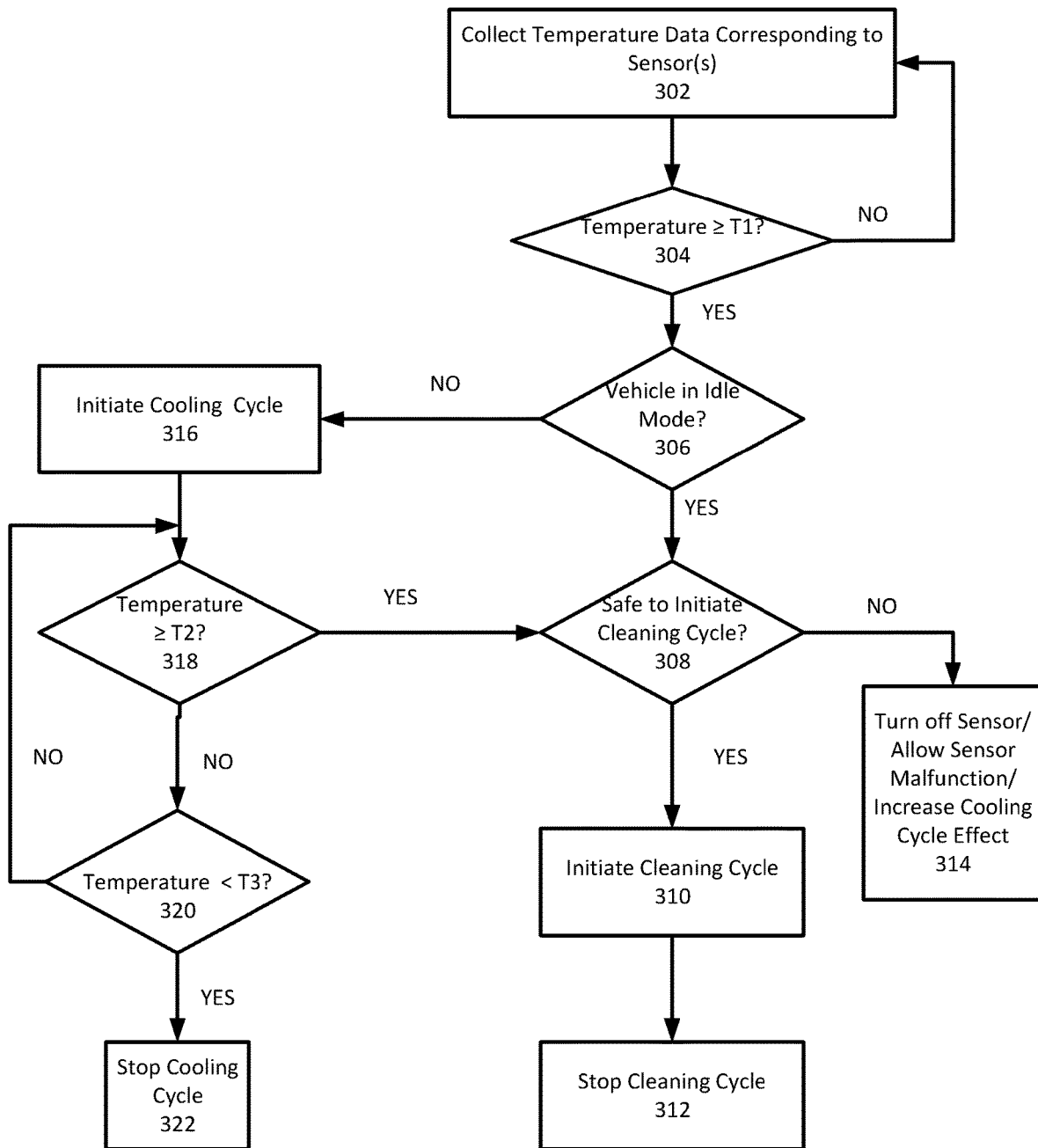
FIG. 3 illustrates an example method of controlling the temperature of one or more sensors in a vehicle.

FIG. 3 is a flowchart in accordance with various embodiments illustrating and describing an example method of controlling the temperature of one or more sensors of a vehicle (cooling effect). While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3 but the process may be integrated and/or one or more steps may be performed together, simultaneously, or the steps may be performed in the order disclosed or in an alternate order. Likewise, one or more steps described below need not be performed.

At 302, the system collects temperature data corresponding to each of the one or more sensors. In an embodiment, the temperature data may be temperature of a sensor. Alternatively and/or additionally, the temperature data may be temperature of the proximate area around a sensor. The system may start collecting temperature data periodically after a triggering event. Examples of the triggering event may include, without limitation, activation of a sensor, ignition of the vehicle engine, detection of an occupant in the vehicle, environmental temperature outside the vehicle over a threshold temperature, ambient temperature inside the vehicle over a threshold temperature, an event indicating that the vehicle will be started within a certain time interval (e.g., in response to a transaction with a passenger requesting a ride in the vehicle using a ride-share app), unlocking of the vehicle, vehicle driver information (e.g., schedules, habits, or the like), presence of the vehicle key within a predetermined distance of the vehicle, user instructions, etc. or a combination thereof.

At 304, the system may determine whether the temperature corresponding to the sensor is greater than or equal to a first threshold temperature (T1). In an embodiment, the system may analyze the collected temperature data corresponding to the sensor and/or in the vicinity of the sensor to determine if the temperature of the sensor is greater than or equal to the first threshold temperature (T1). The first threshold temperature (T1) may be a temperature that is less than or equal to the upper bounds of the operational temperature range of the sensor. Alternatively, the first threshold temperature may be a temperature less than or equal to which the sensor will start to malfunction. If the temperature is less than T1 (304: NO), the system may continue collecting temperature data (i.e., step 302).

If the system determines that the temperature corresponding to the sensor is greater than or equal T1 (304: YES), the system may then determine whether the vehicle is an idle (or standby or low power mode) mode (306). In an embodiment, an idle mode of a vehicle may correspond to the vehicle being in one or more of the following states: the vehicle engine is on but the vehicle is not moving or has been stationary for a certain amount of time (for e.g., stalled in traffic, waiting for a passenger, etc.); when the vehicle engine will be turned on within a threshold period of time; when the vehicle will start moving within a threshold period of time; when the vehicle key is within a predetermined range of the vehicle but the engine is not on and/or the vehicle is not moving; when there is an occupant in the vehicle but the vehicle is stationary and/or the engine is not on; unlocking of the vehicle before the vehicle starts moving, etc., or a combination thereof. The system may determine that that vehicle engine will be turned on and/or the vehicle will start moving within a threshold period of time based on, for example, driver information (e.g., if a driver uses the vehicle at around the same time on most weekdays to commute), vehicle schedule (e.g., if the vehicle is an autonomous vehicle), in response to completion of a transaction with a passenger requesting a ride in the vehicle, in response to receiving a request for a job for the vehicle (e.g., for a construction vehicle, an emergency call for an emergency vehicle), in response to determining that the traffic is going to reduce if the vehicle is stalled in traffic (e.g., based on GPS data), or the like, or a combination thereof. Vehicles such as, without limitation, police vehicles, emergency responder vehicles, taxis, ride-share vehicles, construction and utility vehicles, etc. often spend prolonged periods of time in an idle or standby mode.

The system may also make the determination of whether or not the vehicle is an idle mode based on data obtained from one or more sensors of the vehicle and/or based on lack of data from the sensors (if the sensors are not activated in an idle state).

If the system determines that the vehicle is not in an idle mode (306: NO), the system may cause the temperature control subsystem associated with the sensor to initiate a cooling cycle (316) (for example, to initiate air-based cooling). Initiation of the cooling cycle may include turning on the temperature control subsystem and/or increasing its cooling effect if the temperature control subsystem is already on (e.g., by increasing the fan speed).

In certain embodiments, the temperature control subsystem is first used to cool down the sensor to conserve cleaning fluid and/or to preserve sensor data integrity, and the cleaning cycle is initiated when the temperature control subsystem cannot handle the cooling by itself and/or in a given time, as discussed below.

The system may continue monitoring the temperature of the sensor after initiation of the cooling cycle. At 318, the system may determine whether the temperature of the sensor is greater than or equal to a second threshold temperature (T2). In an embodiment, the second threshold temperature (T2) greater than T1, and is a temperature over which the temperature control subsystem cannot handle the cooling by itself and/or in a given time. If the temperature of the sensor is less than T2 (318: NO), the system may determine (320) whether the temperature of the sensor is less than a third threshold temperature (T3). In an embodiment, the third threshold temperature (T3) is a temperature below which no or reduced cooling action is required for the sensor. If the temperature of the sensor is less than T3 (320: YES), the system stops the cooling cycle (322). In an embodiment, stopping the cooling cycle may include turning off the temperature control subsystem and/or reducing the cooling effect of the temperature control subsystem.

However, if the temperature of the sensor is greater than or equal to T3 (320: NO), the system continues performing steps 316-320.

If the temperature of the sensor is greater than or equal to T2 (318: YES) and/or ff the system determines that the vehicle is in an idle mode (306: YES), the system may perform steps 308-314, as discussed below.

At 308, the system may determine whether it is safe to initiate a cleaning cycle. The system may determine if it safe to initiate the cleaning cycle based on a rule set that includes rules specifying that it is unsafe to initiate the cleaning cycle upon occurrence of one or more conditions. Examples of such conditions may include, without limitation, discomfort to the passengers of the vehicle, creation of hazardous conditions because of sensor cleaning (e.g., obstruction of driver view through the windshield, driver distraction when the vehicle starts moving if it is a manned vehicle, obstruction of sensor functioning, etc.), high traffic area, vehicle moving at high speeds, hazardous weather conditions, vehicle movement at any speed during cleaning cycle, or the like. Additionally and/or alternatively, the rule set may include rules identifying conditions that are determined to be safe for initiation the cleaning cycle such as, without location, location of the vehicle, speed of the vehicle, occupancy of the vehicle, type or location of the sensor, weather conditions time of the day, or the like, such that initiation of a cleaning cycle does not compromise the data collected by a sensor. The inclusion of one or more of the above conditions in the rule set may depend on, without limitation, position of the sensor in the vehicle, type of the sensor, whether or not the vehicle is moving, anticipated start time of vehicle movement, position of vehicle passengers in the vehicle, etc. For example, if the sensor is a camera sensor for which integrity of the data collected will be compromised if cleaning fluid is sprayed on the camera sensor, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, for a manned vehicle, if the sensor is located on or near the windshield, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, if a sensor is critical to navigating through a high traffic area (e.g., blind spot sensor), the rule set may include a rule that it is unsafe to clean the sensor whenever the vehicle is in a high traffic area and/or is anticipated to be in a high traffic area (based on, for example, the navigation system data).

The system may make the determination of whether or not it is safe to initiate a cleaning cycle based on data obtained from one or more sensors of the vehicle.

If the system determines that it is not safe to initiate a cleaning cycle (308: NO), it may cause the sensor to stop functioning (i.e., turn off) in order to prevent sensor malfunction and/or breakdown (314). Alternatively, the system may not turn off the sensor if the sensor functioning is critical to the operation of the vehicle and sensor malfunction is acceptable. In another embodiment, the system may either initiate a cooling cycle using the temperature control subsystem of that sensor or increase the cooling effect of the temperature control subsystem, if it is already turned on (e.g., by increasing fan speed).

However, if the system determines that it is safe to initiate a cleaning cycle (308: YES), the system may cause the sensor cleaning subsystem of the vehicle to initiate a cleaning cycle (310) for the sensor. In an embodiment, initiation of a cleaning cycle causes the controller to operate one or more valves (i.e., open and/or close) of the cleaning subsystem to direct cleaning fluid from the cleaning fluid reservoir towards the sensor. The controller may control the flow rate and/or fluid pressure via a pump. As discussed above, the cleaning fluid has a cooling effect and may bring down the temperature of the sensor within its normal operational range.

In certain embodiments, the cooling cycle may be stopped (if turned on in a non-idle mode) when the cleaning cycle is turned on. Alternatively, the cooling cycle may be executed in association with the cleaning cycle to, for example, cool down the sensor in a shorter time.

At 312, the system may cause the cleaning subsystem to stop the cleaning cycle. In an embodiment, stopping the cleaning cycle causes the controller to operate one or more valves (i.e., open and/or close) of the cleaning subsystem to stop the flow of cleaning fluid from the cleaning fluid reservoir towards the sensor. The system may stop the cleaning cycle upon occurrence of one or more of the following: receipt of user instructions to stop the cleaning cycle, after a certain period of time, based on temperature data corresponding to the sensor (e.g., if the temperature is at least a pre-defined value below T1 if the vehicle is in idle mode, if the temperature is at least a pre-defined value below T2 if the vehicle is not in idle mode, or the like), determining that it unsafe to continue the cleaning cycle (based on the rule set described above in step 308 with respect to unsafe conditions), or upon determining that the vehicle in not in an idle mode. The pre-defined temperature value below T2 may be a temperature value at which the primary temperature control sub-system may be able to cool down the sensor by itself. The pre-defined temperature value below T2 may be determined by taking into account that the cleaning fluid needs some time to cool down the sensor (i.e., cooling is not immediate).

Furthermore, in certain embodiment, the system may continue monitoring the temperature of the sensor after stopping of the cleaning cycle and may cause the sensor to stop functioning (i.e., turn off) in order to prevent sensor malfunction and/or breakdown if the temperature is still greater than or equal to T1 (or T1 plus the hysteresis temperature). Alternatively, the system may let the sensor malfunction.

In certain embodiments, before initiating the cleaning cycle, the system may determine whether the ambient temperature (i.e., the temperature of the environment of the vehicle) is above an ambient temperature threshold. If the system determines that the ambient temperature is above the ambient temperature threshold, the system may turn on a vehicle interior temperature control system (e.g., HVAC system of the vehicle) and/or increase its cooling effect if already on (e.g., by increasing the fan speed) before initiating the cleaning cycle to cool down the interior of the vehicle as well as the sensor.

Figure 4:
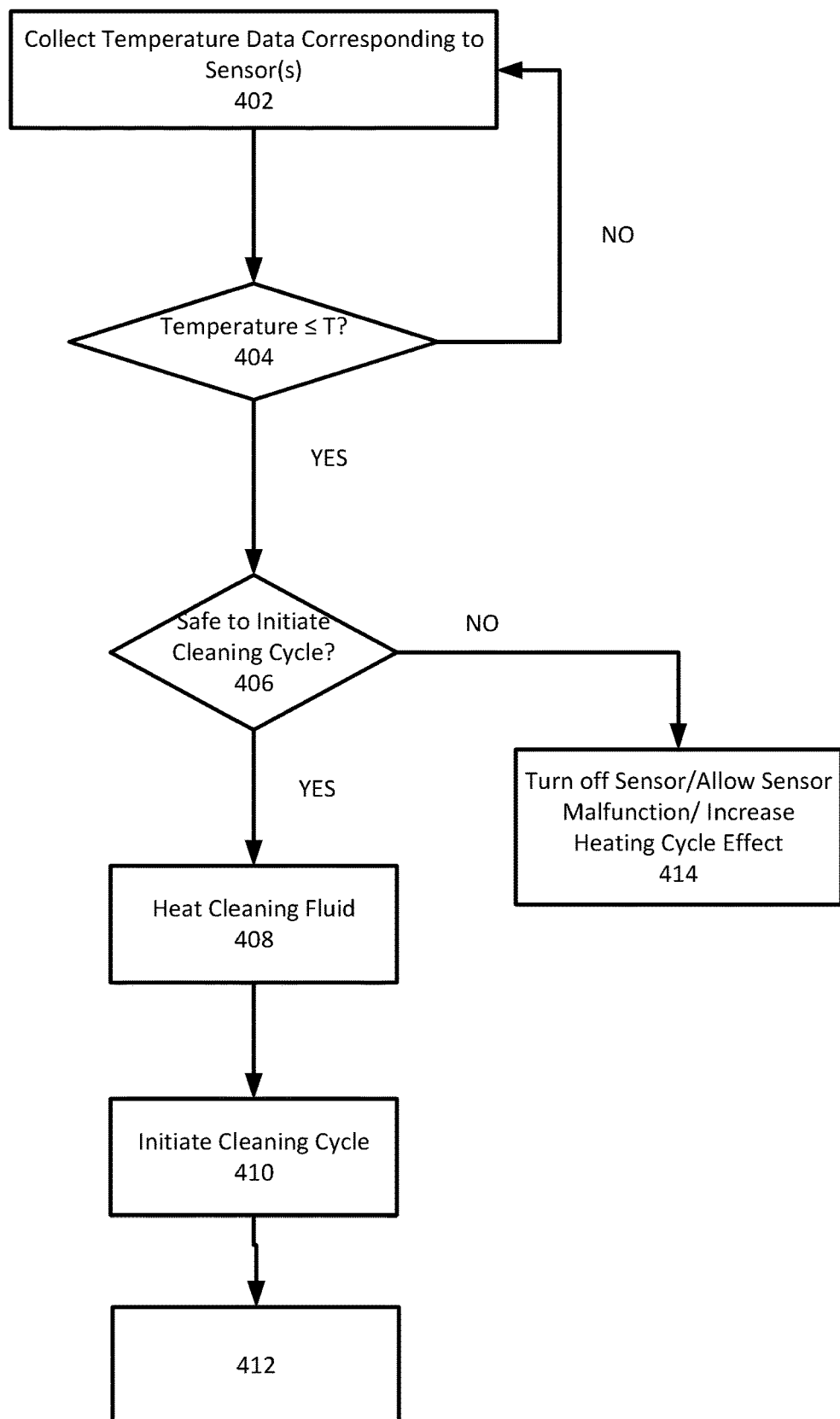
FIG. 4 illustrates another example method of controlling the temperature of one or more sensors in a vehicle.

FIG. 4 is a flowchart in accordance with various embodiments illustrating and describing an example method of using the sensor cleaning subsystem of a vehicle to control the temperature of one or more sensors (heating effect). While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4 but the process may be integrated and/or one or more steps may be performed together, simultaneously, or the steps may be performed in the order disclosed or in an alternate order. Likewise, one or more steps described below need not be performed.

At 402, the system collects temperature data corresponding to each of the one or more sensors. In an embodiment, the temperature data may be temperature of a sensor. Alternatively and/or additionally, the temperature data may be temperature of the proximate area around a sensor. The system may start collecting temperature data periodically after a triggering event. Examples of the triggering event may include, without limitation, activation of a sensor, ignition of the vehicle engine, detection of an occupant in the vehicle, environmental temperature outside the vehicle below a threshold temperature, ambient temperature inside the vehicle below a threshold temperature, an event indicating that the vehicle will be started within a certain time interval (e.g., in response to a transaction with a passenger requesting a ride in the vehicle using a ride-share app), unlocking of the vehicle, vehicle driver information (e.g., schedules, habits, or the like), presence of the vehicle key within a predetermined distance of the vehicle, user instructions, etc. or a combination thereof.

At 404, the system may determine whether the temperature corresponding to the sensor is less than or equal to a threshold temperature (T). In an embodiment, the system may analyze the collected temperature data corresponding to the sensor and/or in the vicinity of the sensor to determine if the temperature of the sensor is less than or equal to the threshold temperature (T). The threshold temperature (T) may be a temperature that is greater than or equal to the lower bounds of the operational temperature range of the sensor. Alternatively, the threshold temperature may be a temperature greater than or equal to a temperature at which the sensor will start to malfunction. If the temperature is greater than T (404: NO), the system may continue collecting temperature data (i.e., step 402).

If the temperature is less than or equal to T (404: NO), the system may at 406 determine whether it is safe to initiate a cleaning cycle. The system may determine if it safe to initiate the cleaning cycle based on a rule set that includes rules specifying that it is unsafe to initiate the cleaning cycle upon occurrence of one or more conditions. Examples of such conditions may include, without limitation, discomfort to the passengers of the vehicle, creation of hazardous conditions because of sensor cleaning (e.g., obstruction of driver view through the windshield, driver distraction when the vehicle starts moving if it is a manned vehicle, obstruction of sensor functioning, etc.), high traffic area, vehicle moving at high speeds, hazardous weather conditions, vehicle movement at any speed during cleaning cycle, or the like. Additionally and/or alternatively, the rule set may include rules identifying conditions that are determined to be safe for initiation the cleaning cycle such as, without limitation, location of the vehicle, speed of the vehicle, occupancy of the vehicle, type or location of the sensor, weather conditions time of the day, or the like, such that initiation of a cleaning cycle does not compromise the data collected by a sensor and/or may lead to a hazardous condition (e.g., accident). The inclusion of one or more of the above conditions in the rule set may depend on, without limitation, position of the sensor in the vehicle, type of the sensor, whether or not the vehicle is moving, anticipated start time of vehicle movement, position of vehicle passengers in the vehicle, etc. For example, if the sensor is a camera sensor for which integrity of the data collected will be compromised if cleaning fluid is sprayed on the camera sensor, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, for a manned vehicle, if the sensor is located on or near the windshield, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, if a sensor is critical to navigating through a high traffic area (e.g., blind spot sensor), the rule set may include a rule that it is unsafe to clean the sensor whenever the vehicle is in a high traffic area and/or is anticipated to be in a high traffic area (based on, for example, the navigation system data).

The system may make the determination of whether or not it is safe to initiate a cleaning cycle based on data obtained from one or more sensors of the vehicle.

If the system determines that it is not safe to initiate a cleaning cycle (406: NO), it may cause the sensor to stop functioning (i.e., turn off) in order to prevent sensor malfunction and/or breakdown (414). Alternatively, the system may not turn off the sensor if the sensor functioning is critical to the operation of the vehicle and sensor malfunction is acceptable. In another embodiment, the system may either initiate a heating cycle using the temperature control subsystem of that sensor and/or increase the heating effect of the temperature control subsystem, if it is already turned on (e.g., by increasing fan speed if hot air is being circulated by the temperature control subsystem, by decreasing the fan speed if cold air is being circulated by the temperature control subsystem, etc.).

However, if the system determines that it is safe to initiate a cleaning cycle (408: YES), the system may cause a fluid heater to heat the cleaning fluid (410), and the sensor cleaning subsystem of the vehicle to initiate a cleaning cycle (412) for the sensor using the heated cleaning fluid. The fluid heater may receive thermal energy for heating the cleaning fluid from a dedicated thermal energy source (e.g., a heater), waste heat generated by the engine (e.g., power train), and/or heat generated inside the vehicle cabin.

In an embodiment, initiation of a cleaning cycle causes the controller to operate one or more valves (i.e., open and/or close) of the cleaning subsystem to direct heated cleaning fluid from the cleaning fluid reservoir towards the sensor. The controller may control the flow rate and/or fluid pressure via a pump. In certain embodiment, the cleaning fluid is heated in the cleaning fluid reservoir itself. Alternatively and/or additionally, a heater is configured to heat the cleaning fluid in a different reservoir. The heated cleaning fluid may bring up the temperature of the sensor within its normal operational range.

At 412, the system may cause the cleaning subsystem to stop the cleaning cycle. In an embodiment, stopping the cleaning cycle causes the controller to operate one or more valves (i.e., open and/or close) of the cleaning subsystem to stop the flow of cleaning fluid from the cleaning fluid reservoir towards the sensor. The system may stop the cleaning cycle upon occurrence of one or more of the following: receipt of user instructions to stop the cleaning cycle, after a certain period of time, based on temperature data corresponding to the sensor (e.g., if the temperature is at least a pre-defined value above T, determining that it unsafe to continue the cleaning cycle (based on the rule set described above in step 408 with respect to unsafe conditions), etc. The pre-defined temperature value above T may be determined by taking into account that the cleaning fluid needs some time to heat the sensor (i.e., heating is not immediate).

Furthermore, in certain embodiment, the system may continue monitoring the temperature of the sensor after stopping of the cleaning cycle and may cause the sensor to stop functioning (i.e., turn off) in order to prevent sensor malfunction and/or breakdown if the temperature is still less than or equal to T. Alternatively, the system may let the sensor malfunction.

Figure 5:
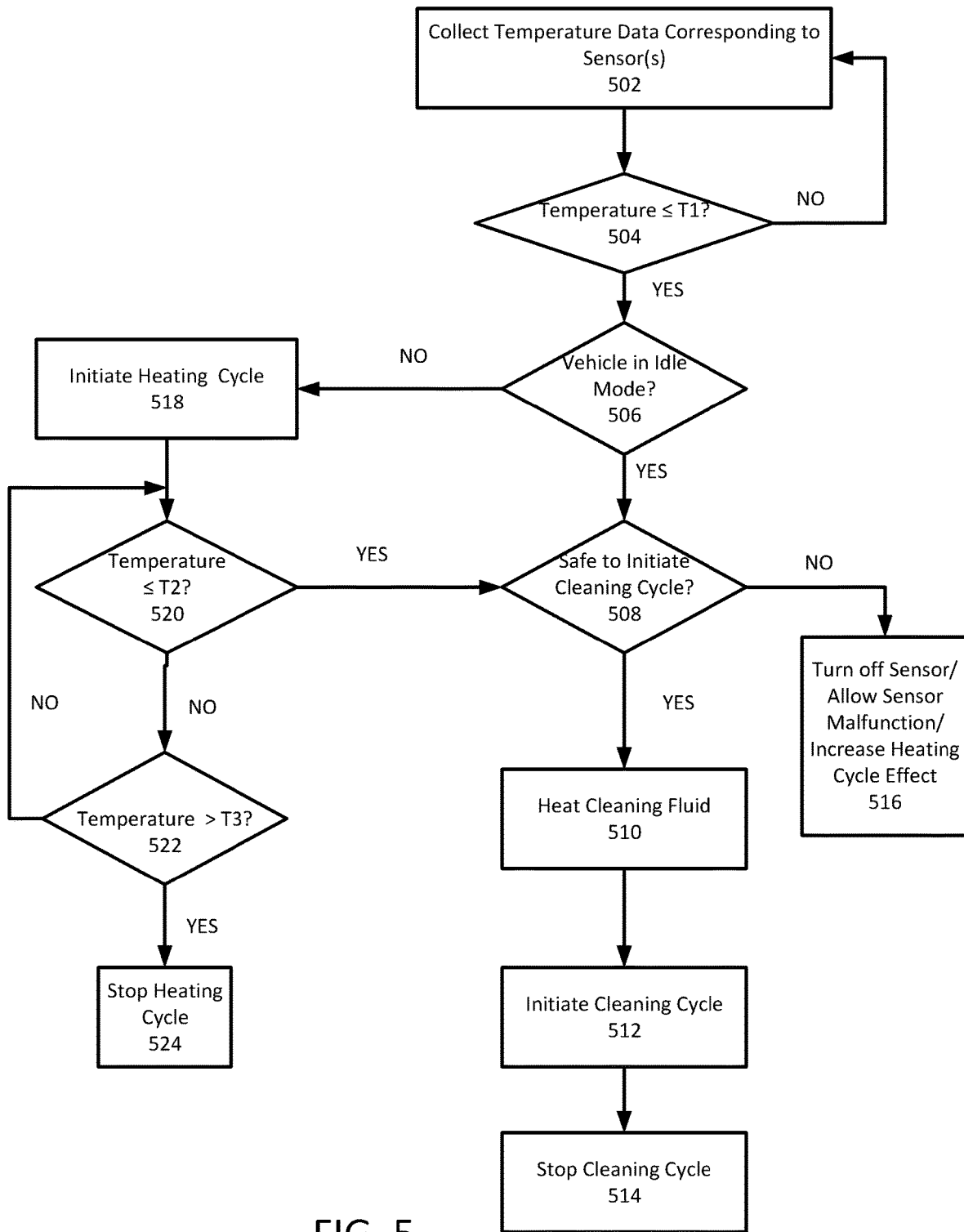
FIG. 5 illustrates an example method of controlling the temperature of one or more sensors in a vehicle.

FIG. 5 is a flowchart in accordance with various embodiments illustrating and describing an example method of using the sensor cleaning subsystem of a vehicle to control the temperature of one or more sensors (heating effect). While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5 but the process may be integrated and/or one or more steps may be performed together, simultaneously, or the steps may be performed in the order disclosed or in an alternate order. Likewise, one or more steps described below need not be performed.

At 502, the system collects temperature data corresponding to each of the one or more sensors. In an embodiment, the temperature data may be temperature of a sensor. Alternatively and/or additionally, the temperature data may be temperature of the proximate area around a sensor. The system may start collecting temperature data periodically after a triggering event. Examples of the triggering event may include, without limitation, activation of a sensor, ignition of the vehicle engine, detection of an occupant in the vehicle, environmental temperature outside the vehicle below a threshold temperature, ambient temperature inside the vehicle below a threshold temperature, an event indicating that the vehicle will be started within a certain time interval (e.g., in response to a transaction with a passenger requesting a ride in the vehicle using a ride-share app), unlocking of the vehicle, vehicle driver information (e.g., schedules, habits, or the like), presence of the vehicle key within a predetermined distance of the vehicle, user instructions, etc. or a combination thereof.

At 504, the system may determine whether the temperature corresponding to the sensor is less than or equal to a first threshold temperature (T1). In an embodiment, the system may analyze the collected temperature data corresponding to the sensor and/or in the vicinity of the sensor to determine if the temperature of the sensor is less than or equal to the first threshold temperature (T1). The first threshold temperature (T1) may be a temperature that is greater than or equal to the lower bounds of the operational temperature range of the sensor and/or greater than or equal to which the sensor will start to malfunction (e.g., if the sensor stops functioning at about −40° C., T1 may be about −30° C.). If the temperature is greater than T1 (505: NO), the system may continue collecting temperature data (i.e., step 502).

If the system determines that the temperature corresponding to the sensor is less than or equal T1 (505: YES), the system may then determine whether the vehicle is an idle (or standby or low power mode) mode (506). In an embodiment, an idle mode of a vehicle may correspond to the vehicle being in one or more of the following states: the vehicle engine is on but the vehicle is not moving or has been stationary for a certain amount of time (for e.g., stalled in traffic, waiting for a passenger, etc.); when the vehicle engine will be turned on within a threshold period of time; when the vehicle will start moving within a threshold period of time; when the vehicle key is within a predetermined range of the vehicle but the engine is not on and/or the vehicle is not moving; when there is an occupant in the vehicle but the vehicle is stationary and/or the engine is not on; unlocking of the vehicle before the vehicle starts moving, etc., or a combination thereof. The system may determine that that vehicle engine will be turned on and/or the vehicle will start moving within a threshold period of time based on, for example, driver information (e.g., if a driver uses the vehicle at around the same time on most weekdays to commute), vehicle schedule (e.g., if the vehicle is an autonomous vehicle), in response to completion of a transaction with a passenger requesting a ride in the vehicle, in response to receiving a request for a job for the vehicle (e.g., for a construction vehicle, an emergency call for an emergency vehicle), in response to determining that the traffic is going to reduce if the vehicle is stalled in traffic (e.g., based on GPS data), or the like, or a combination thereof. Vehicles such as, without limitation, police vehicles, emergency responder vehicles, taxis, ride-share vehicles, construction and utility vehicles, etc. often spend prolonged periods of time in an idle or standby mode.

The system may also make the determination of whether or not the vehicle is an idle mode based on data obtained from one or more sensors of the vehicle and/or based on lack of data from the sensors (if the sensors are not activated in an idle state).

If the system determines that the vehicle is not in an idle mode (506: NO), the system the system may cause the temperature control subsystem associated with the sensor to initiate a heating cycle (518) (for example, blowing hot air over the sensor). Initiation of the heating cycle may include turning on the temperature control subsystem and/or increasing its heating effect if the temperature control subsystem is already on (e.g., by increasing the fan speed or temperature of air if a fan is blowing hot air, lowering the fan speed if the fan is blowing cold air, etc.).

In certain embodiments, temperature control subsystem may be used to heat the sensor to conserve cleaning fluid and/or to preserve sensor data integrity, and the cleaning cycle is initiated when the temperature control subsystem cannot handle the heating by itself and/or in a given time, as discussed below.

The system may continue monitoring the temperature of the sensor after initiation of the heating cycle. At 520, the system may determine whether the temperature of the sensor is less than or equal to a second threshold temperature (T2). In an embodiment, the second threshold temperature (T2) less than T1, and is a temperature under which the temperature control subsystem cannot handle the heating by itself and/or in a given time. If the temperature of the sensor is less than T2 (520: NO), the system may determine (522) whether the temperature of the sensor is greater than a third threshold temperature (T3). In an embodiment, the third threshold temperature (T3) is a temperature above which no or reduced heating action is required for the sensor. If the temperature of the sensor is greater than T3 (522: YES), the system stops the heating cycle (524). In an embodiment, stopping the heating cycle may include turning off the temperature control subsystem and/or reducing the heating effect of the temperature control subsystem.

However, if the temperature of the sensor is less than or equal to T3 (522: NO), the system continues performing steps 518-522.

If the temperature of the sensor is less than or equal to T2 (520: YES) and/or the system determines that the vehicle is in an idle mode (506: YES), the system may perform steps 508-516, as discussed below.

At 508, the system may determine whether it is safe to initiate a cleaning cycle. The system may determine if it safe to initiate the cleaning cycle based on a rule set that includes rules specifying that it is unsafe to initiate the cleaning cycle upon occurrence of one or more conditions. Examples of such conditions may include, without limitation, discomfort to the passengers of the vehicle, creation of hazardous conditions because of sensor cleaning (e.g., obstruction of driver view through the windshield, driver distraction when the vehicle starts moving if it is a manned vehicle, obstruction of sensor functioning, etc.), high traffic area, vehicle moving at high speeds, hazardous weather conditions, vehicle movement at any speed during cleaning cycle, or the like. Additionally and/or alternatively, the rule set may include rules identifying conditions that are determined to be safe for initiation the cleaning cycle such as, without location, location of the vehicle, speed of the vehicle, occupancy of the vehicle, type or location of the sensor, weather conditions time of the day, or the like, such that initiation of a cleaning cycle does not compromise the data collected by a sensor. The inclusion of one or more of the above conditions in the rule set may depend on, without limitation, position of the sensor in the vehicle, type of the sensor, whether or not the vehicle is moving, anticipated start time of vehicle movement, position of vehicle passengers in the vehicle, etc. For example, if the sensor is a camera sensor for which integrity of the data collected will be compromised if cleaning fluid is sprayed on the camera sensor, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, for a manned vehicle, if the sensor is located on or near the windshield, the rule set may include a rule that it is unsafe to clean the sensor whenever the vehicle is moving. Hence, the system may determine that it is not safe to initiate the cleaning cycle if the vehicle is moving and/or is going to start moving during the cleaning cycle. Similarly, if a sensor is critical to navigating through a high traffic area (e.g., blind spot sensor), the rule set may include a rule that it is unsafe to clean the sensor whenever the vehicle is in a high traffic area and/or is anticipated to be in a high traffic area (based on, for example, the navigation system data).

The system may make the determination of whether or not it is safe to initiate a cleaning cycle based on data obtained from one or more sensors of the vehicle.

If the system determines that it is not safe to initiate a cleaning cycle (508: NO), it may cause the sensor to stop functioning (i.e., turn off) in order to prevent sensor malfunction and/or breakdown (516). Alternatively, the system may not turn off the sensor if the sensor functioning is critical to the operation of the vehicle and sensor malfunction is acceptable. In another embodiment, the system may either initiate a heating cycle using the temperature control subsystem of that sensor or increase the heating effect of the temperature control subsystem, if it is already turned on (e.g., by increasing fan speed).

However, if the system determines that it is safe to initiate a cleaning cycle (508: YES), the system may cause a fluid heater to heat the cleaning fluid (510) and the sensor cleaning subsystem of the vehicle to initiate a cleaning cycle (512) for the sensor using the heated cleaning fluid. The fluid heater may receive thermal energy for heating the cleaning fluid from a dedicated thermal energy source (e.g., a heater), waster heat generated by the engine (e.g., power train), and/or heat generated inside the vehicle cabin.

In an embodiment, initiation of a cleaning cycle causes the controller to operate one or more valves (i.e., open and/or close) of the cleaning subsystem to direct heated cleaning fluid from the cleaning fluid reservoir towards the sensor. The controller may control the flow rate and/or fluid pressure via a pump. In certain embodiment, the cleaning fluid is heated in the cleaning fluid reservoir itself. Alternatively and/or additionally, a heater is configured to heat the cleaning fluid in a different reservoir. The heated cleaning fluid bring up the temperature of the sensor within its normal operational range.

In certain embodiments, the heating cycle may be stopped (if turned on in a non-idle mode) when the cleaning cycle is turned on. Alternatively, the heating cycle may be executed in association with the cleaning cycle to, for example, cool down the sensor in a shorter time.

At 514, the system may cause the cleaning subsystem to stop the cleaning cycle. In an embodiment, stopping the cleaning cycle causes the controller to operate one or more valves (i.e., open and/or close) of the cleaning subsystem to stop the flow of cleaning fluid from the cleaning fluid reservoir towards the sensor. The system may stop the cleaning cycle upon occurrence of one or more of the following: receipt of user instructions to stop the cleaning cycle, after a certain period of time, based on temperature data corresponding to the sensor (e.g., if the temperature is at least a pre-defined value above T1 if the vehicle is in idle mode, if the temperature is at least a pre-defined value above T2 if the vehicle is not in idle mode, or the like), determining that it unsafe to continue the cleaning cycle (based on the rule set described above in step 208 with respect to unsafe conditions), or upon determining that the vehicle in not in an idle mode. The pre-defined temperature value above T2 may be a temperature value at which the primary temperature control sub-system may be able to heat the sensor by itself. The pre-defined temperature value above T2 may be determined by taking into account that the cleaning fluid needs some time to heat the sensor (i.e., cooling is not immediate).

While the current disclosure describes monitoring and controlling the temperature of each individual sensor, the system may monitor and/or control the temperature of a plurality of sensors. For example, in certain embodiments, the system may determine whether the temperature corresponding to a subset of the one or more sensors is above a threshold temperature, where the subset of the one or more sensors located close to each other. The threshold temperature may be greater than or equal to, without limitation, an average of the upper bounds of the operational temperature ranges of the subset of the sensors, highest of the upper bounds of the operational temperature ranges of the subset of the sensors, lowest of the upper bounds of the operational temperature ranges of the subset of the sensors, or any other temperature above which at least some of the subset of the sensors will start to malfunction.

It will be understood to those skilled in the art that the initiation of a cleaning cycle to bring down the temperature of a sensor does not impact the initiation of a cleaning cycle if the sensor needs cleaning using now or hereafter known methods. Rather, the current disclosure describes a method for using existing hardware or components of a cleaning subsystem of a vehicle to maintain the temperature of the sensors in the vehicle within their operational range in addition to cleaning the sensors.

Figure 6:
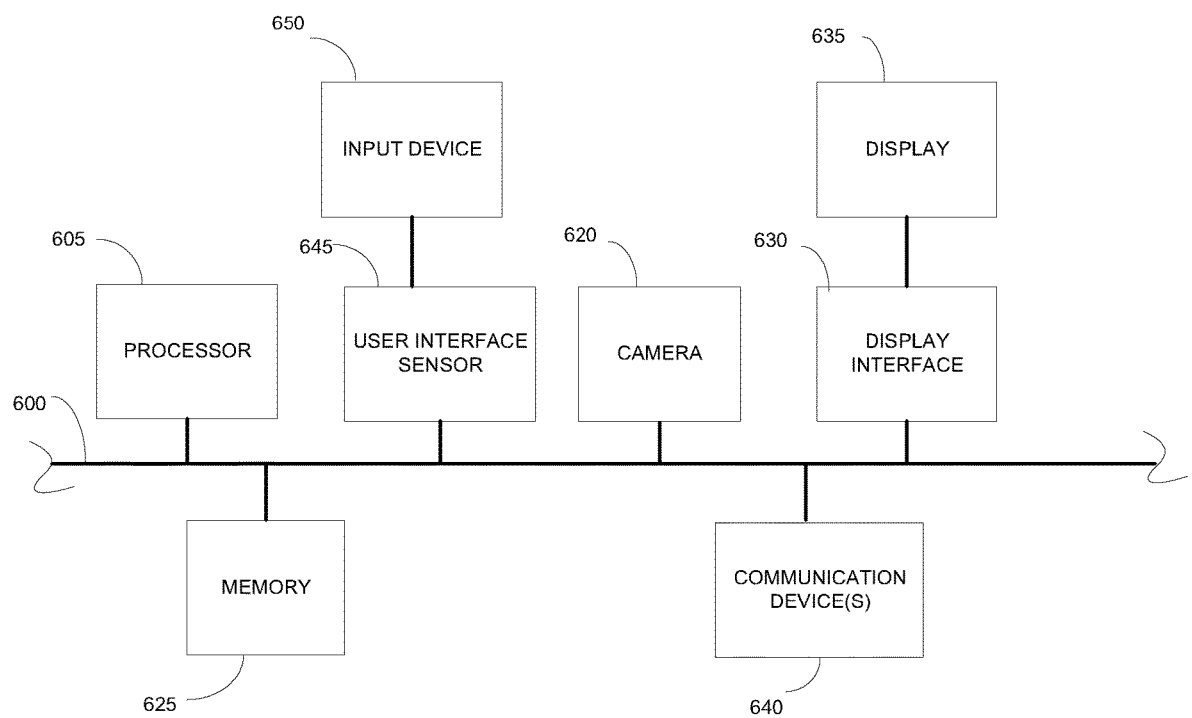
FIG. 6 is a block diagram of elements of a computing device on which the various systems and methods in this document could be implemented.

FIG. 6 depicts an example of internal hardware that may be included in any of the electronic components of the system, such as the controller, the one or more sensors, or a local or remote computing device in the system. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors or devices to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 650 such as a wireless antenna, an RFID tag and/or short-range or near-field communication transceiver, each of which may optionally communicatively connect with other components of the device via one or more communication system. The communication device(s) 650 may be configured to be communicatively connected to a communications network, such as the Internet, a local area network or a cellular telephone data network.

The hardware may also include a user interface sensor 655 that allows for receipt of data from input devices 650 such as a keyboard, a mouse, a joystick, a touchscreen, a touch pad, a remote control, a pointing device and/or microphone. Digital image frames also may be received from a camera 620 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method for cooling a sensor of a vehicle, the method comprising:
    receiving temperature data corresponding to the sensor from a temperature monitor associated with the sensor; and
    in response to determining that a current temperature of the sensor being greater than a first threshold temperature:
        determining a mode of the vehicle, and in response to the mode being a first mode, causing a sensor cleaning subsystem of the vehicle to initiate a cleaning cycle and direct cleaning fluid to the sensor to cool down the sensor.

2. The method of claim 1, wherein the threshold temperature is less than an upper bound of an operational temperature range of the sensor.

3. The method of claim 1, wherein the first mode is a safe to clean mode.

4. The method of claim 3, further comprising determining that the vehicle is not in the safe to clean mode upon occurrence of at least one of the following conditions: obstruction of driver view because of sensor cleaning; driver distraction because of sensor cleaning; degradation of sensor function because of sensor cleaning; the vehicle being in a an area having traffic that is greater than a threshold; the vehicle moving at a speed that is greater than a threshold; one or more weather conditions; or movement of the vehicle during a cleaning cycle.

5. The method of claim 1, wherein the first mode is an idle mode.

6. The method of claim 5, further comprising, in response to determining that the vehicle is not in the idle mode, causing a temperature control subsystem of the vehicle to initiate a cooling cycle to cool down the sensor.

7. The method of 6, further comprising, in response to determining the current temperature being greater than a second threshold temperature, causing the sensor cleaning subsystem to initiate the cleaning cycle and direct the cleaning fluid to the sensor to cool down the sensor.

8. The method of claim 7, wherein the second threshold temperature is greater than the first threshold temperature.

9. The method of claim 7, further comprising, before causing the sensor cleaning subsystem to initiate the cleaning cycle:
  determining whether the vehicle is in a safe to clean mode; and
  initiating the cleaning cycle only in response to determining that the vehicle is in the safe to clean mode.

10. The method of claim 5, further comprising determining that the vehicle is in the idle mode upon occurrence of at least one of the following conditions: the vehicle being stationary for a certain time period; an indication that a vehicle engine will be turned on within a threshold period of time; an indication that the vehicle will start moving within a threshold period of time; a vehicle key being within a predetermined range of the vehicle; presence of an occupant in the vehicle which the vehicle is stationary; or unlocking of the vehicle before the vehicle starts moving.

11. The method of claim 6, wherein initiation of the cooling cycle comprises at least one of the following:
  turning on of the temperature control subsystem, or
  increasing a cooling efficiency of the temperature control subsystem.

12. The method of claim 1, further comprising stopping the cleaning cycle upon occurrence of one or more of the following:
  after a pre-determined time period;
  in response to determining that the current temperature of the sensor is less than the first threshold temperature;
  receipt of user instructions;
  in response to determining that it is unsafe to continue the cleaning cycle; or
  end of an idle mode of the vehicle.

13. The method of claim 1, wherein the cleaning fluid comprises at least one of the following: methanol, ethanol, glycol, isopropyl alcohol, or water.

14. The method of claim 1, further comprising receiving the temperature data corresponding to the sensor from the temperature monitor associated with the sensor in response to detecting a triggering event, the triggering event comprising at least one of the following: activation of the sensor; ignition of a vehicle engine; detection of an occupant in the vehicle; detecting that environmental temperature outside the vehicle is greater than a second threshold temperature; detecting that ambient temperature inside the vehicle greater than a third threshold temperature; an indication that the vehicle will be started within a certain time interval; unlocking of the vehicle; presence of a vehicle key within a predetermined distance of the vehicle; or user instructions.

15. The method of claim 1, further comprising:
  monitoring the temperature of the sensor after initiation of the cleaning cycle; and
  in response to the temperature of the sensor being greater than the first threshold temperature after a time period, shutting down the sensor.

16. A vehicle sensor system comprising:
  a sensor that is attached to a vehicle;
  a temperature monitor configured to collect temperature data corresponding to the sensor;
  a processor in communication with the temperature monitor;
  a sensor cleaning subsystem that comprises a cleaning fluid reservoir and a port that is positioned to direct cleaning fluid from the reservoir to the sensor; and
  a non-transitory computer-readable medium comprising one or more programming instructions that when executed by the processor, will cause the processor to:
    receive temperature data corresponding to the sensor from the temperature monitor,
    in response to a current temperature of the sensor being greater than a first threshold temperature while the vehicle is in an idle mode cause the sensor cleaning subsystem to initiate a cleaning cycle and direct the cleaning fluid to the sensor to cool down the sensor.

17. The vehicle sensor system of claim 16, further comprising one or more programming instructions that when executed by the processor, will cause the processor to determine that the vehicle is in the idle mode upon occurrence of at least one of the following conditions: the vehicle being stationary for a certain time period; an indication that a vehicle engine will be turned on within a threshold period of time; an indication that the vehicle will start moving within a threshold period of time; a vehicle key being within a predetermined range of the vehicle; presence of an occupant in the vehicle which the vehicle is stationary, or unlocking of the vehicle before the vehicle starts moving.

18. The vehicle sensor system of claim 16, wherein the threshold temperature is less than an upper bound of an operational temperature range of the sensor.

19. The vehicle sensor system of claim 16, further comprising programming instructions that when executed by the processor, will cause the processor to, before causing the sensor cleaning subsystem to initiate the cleaning cycle:
  determine whether the vehicle is in a safe to clean mode; and
  causing the sensor cleaning subsystem to initiate the cleaning cycle only in response to determining that the vehicle is in the safe to clean mode.

20. The vehicle sensor system of claim 19, further comprising one or more programming instructions that when executed by the processor, will cause the processor to determine that the vehicle is not in the safe to clean mode upon occurrence of at least one of the following conditions:

obstruction of driver view because of sensor cleaning; driver distraction because of sensor cleaning; degradation of sensor function because of sensor cleaning: the vehicle being in a an area having traffic that is greater than a threshold; the vehicle moving at a speed that is greater than a threshold; one or more weather conditions; or movement of the vehicle during a cleaning cycle.

\* \* \* \* \*